(12) United States Patent
Chiu et al.

(10) Patent No.: US 7,397,283 B2
(45) Date of Patent: Jul. 8, 2008

(54) DIGITAL A/V TRANSMISSION PHY SIGNALING FORMAT CONVERSION, MULTIPLEXING, AND DE-MULTIPLEXING

(75) Inventors: Jimmy Chiu, Saratoga, CA (US); Ming Qu, San Jose, CA (US); Ji Zhao, Saratoga, CA (US)

(73) Assignee: Parade Technologies, Ltd., George Town, Grand Cayman (KY)

( * ) Notice: Subject to any disclaimer, the term of this patent is extended or adjusted under 35 U.S.C. 154(b) by 131 days.

(21) Appl. No.: 11/537,377

(22) Filed: Sep. 29, 2006

(65) Prior Publication Data

US 2008/0079462 A1    Apr. 3, 2008

(51) Int. Cl.
*H03K 19/094* (2006.01)
*H04N 7/01* (2006.01)

(52) U.S. Cl. ............... 326/83; 326/115; 348/441; 345/204; 375/219; 375/240

(58) Field of Classification Search ............. 326/82–83, 326/86, 112, 115; 348/441; 345/204; 375/219, 375/240
See application file for complete search history.

(56) References Cited

U.S. PATENT DOCUMENTS

| | | | | |
|---|---|---|---|---|
| 6,292,229 B1 * | 9/2001 | Meyer | ............. | 348/705 |
| 6,313,882 B1 * | 11/2001 | Limberg et al. | ............. | 348/614 |
| 6,469,744 B1 * | 10/2002 | Pearlstein | ............. | 348/554 |
| 6,480,545 B1 * | 11/2002 | Symes | ............. | 375/240.26 |
| 2007/0103204 A1 * | 5/2007 | Egan et al. | ............. | 327/100 |
| 2008/0061837 A1 * | 3/2008 | Xu et al. | ............. | 326/127 |

OTHER PUBLICATIONS

"Digital Visual Interface—DVI," Digital Display Working Group, Revision 1.0, Apr. 2, 1999, pp. 1-76.
"High-Definition Multimedia Interface Specification, Version 1.3," Hitachi, Ltd., Jun. 22, 2006, pp. 1-237.
"DisplayPort™ Proposed Standard," Version 1, Video Electronics Standards Association, May 1, 2006, pp. 1-205.

* cited by examiner

*Primary Examiner*—Rexford Barnie
*Assistant Examiner*—Jason M Crawford
(74) *Attorney, Agent, or Firm*—Fenwick & West LLP

(57) ABSTRACT

A circuit includes a configurable receiver circuit, a multiplexer or demultiplexer coupled to the configurable receiver circuit, and a configurable driver circuit coupled to the multiplexer or demultiplexer. The configurable receiver circuit generates an internal format signal which is received by the multiplexer or demultiplexer. The configurable driver circuit receives the internal format signal from the multiplexer or demultiplexer.

43 Claims, 4 Drawing Sheets

DIGITAL A/V TRANSMISSION PHY SIGNALING FORMAT CONVERSION, MULTIPLEXING, AND DE-MULTIPLEXING

BACKGROUND OF THE INVENTION

The need for digital audio and video (A/V) interfacing has increased with current consumer electronics devices. Applications include, for example, interfacing personal computer (PC) desktops with a variety of display monitors, DVD players or set-up boxes with television sets, A/V receivers with television sets, and PC desktops with television sets. A variety of digital interface protocols are in use. Such display interface protocols include, but are not limited to, Digital Visual Interface (DVI), High Definition Multimedia Interface (HDMI), and DisplayPort. Furthermore, since there is a need for multiple electronic devices to interface with one another, there is a need for multi-port switching between devices.

As semiconductor technology advances, and transistor feature size decreases, the integration of different interface protocols becomes both feasible and economically efficient. An integration approach makes it possible to have all-in-one multi-protocol interfacing with respect to logic functions. However, physical electrical signaling incompatibility between different protocols remains a problem.

Thus, there is a need for improved systems and methods for multi-protocol interfacing and switching.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
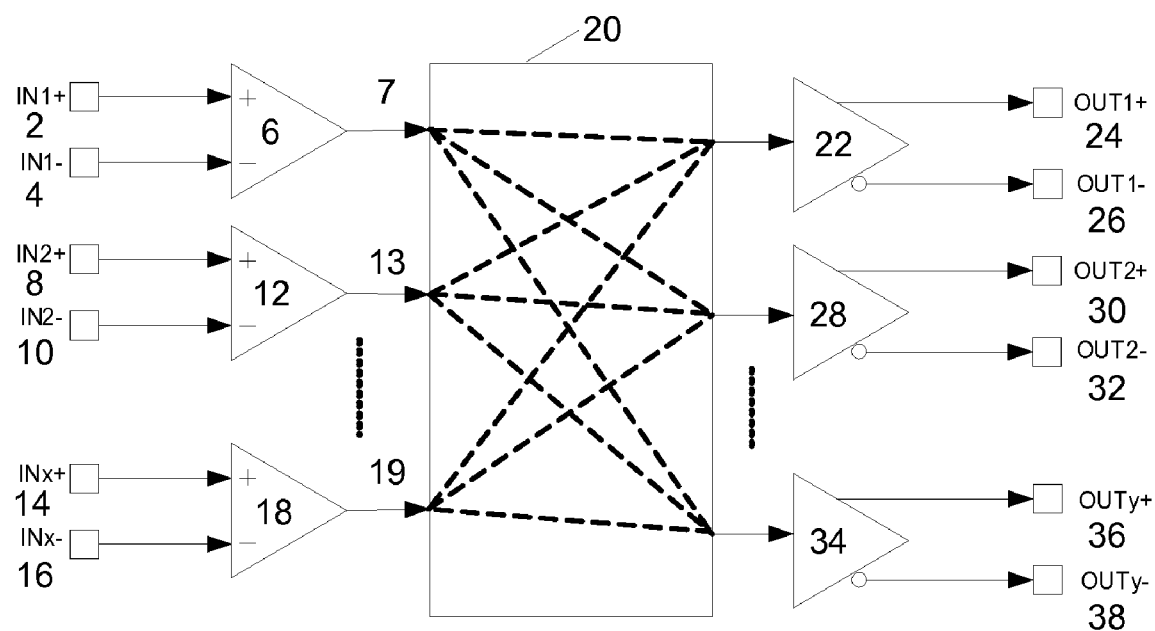
FIG. 1 illustrates a diagram of a digital A/V transmission PHY signaling format conversion system to realize digital A/V switching for different digital A/V signaling formats in one example of the invention.

Systems and methods for digital A/V transmission PHY signaling format conversion, multiplexing, and de-multiplexing are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Particular circuit layouts and circuit components may be given for illustrative purposes. This is done for illustrative purposes to facilitate understanding only and one of ordinary skill in the art may vary the design and implementation parameters and still remain within the scope of the invention.

Generally, this description relates to the design and manufacture of integrated semiconductor circuits. In particular, high-speed digital A/V interfacing circuits are described. Circuits and methods for digital Audio/Video (A/V) signaling and transmission are described. The circuits and method may be used, for example, with personal computers and consumer electronics devices such as set top boxes, televisions, and DVD players.

In one example, circuits and methods for universal signaling format conversion are described, providing a solution to convert different A/V signaling formats at the physical layer (PHY) level. Such different A/V signaling formats at the physical layer include, for example AC- and DC-coupling and/or source terminated or open drain driving schemes which are used in interface protocols such as DisplayPort, HDMI, and DVI. Although certain examples herein refer to typical applications associated with DisplayPort, HDMI, and DVI protocols, the systems and methods described herein can be applied to any digital A/V interface protocol for signaling format conversion at the physical layer. The VESA, DisplayPort™ Standard, Version 1, May 1, 2006, High-Definition Multimedia Interface Specification, Version 1.3, Jun. 22, 2006, and DDWG, Digital Visual Interface Specification, Revision 1.0, 1999, are hereby incorporated by reference.

In one example, a circuit includes a configurable receiver circuit, a multiplexer or demultiplexer, and a configurable driver circuit. The configurable receiver circuit includes a first input node, a second input node, a switchable first resistor coupled to the first input node, a switchable second resistor coupled to the second input node, and a switchable self-biasing circuit coupled to the first input node and the second input node. A supply voltage is coupled to the switchable first resistor and the switchable second resistor. An amplifier generates an internal format signal. The multiplexer or demultiplexer is coupled to the configurable receiver circuit for receiving the internal format signal. The configurable driver circuit is coupled to the multiplexer or demultiplexer for receiving the internal format signal.

The configurable driver circuit includes a first transistor and a second transistor in a differential pair configuration, a switchable first source termination resistor coupled to a first transistor drain at a first output node, a switchable second source termination resistor coupled to a second transistor drain at a second output node, and a current source coupled to a first transistor source and a second transistor source.

In a further example, a circuit includes a configurable receiver circuit, a demultiplexer, a first configurable driver circuit coupled to the demultiplexer, and a second configurable driver circuit coupled to the demultiplexer. The configurable receiver circuit includes a first input node, a second input node, a switchable first resistor coupled to the first input node, a switchable second resistor coupled to the second input node, and a switchable self-biasing circuit coupled to the first input node and the second input node. A supply voltage is coupled to the switchable first resistor and the switchable second resistor. An amplifier generates an internal format signal.

The demultiplexer is coupled to the configurable receiver circuit for receiving and routing the internal format signal.

The first configurable driver circuit includes a first transistor and a second transistor in a first differential pair configuration, a switchable first source termination resistor coupled to a first transistor drain at a first output node, and a switchable second source termination resistor coupled to a second transistor drain at a second output node. The second configurable driver circuit includes a third transistor and a fourth transistor in a second differential pair configuration, a switchable third source termination resistor coupled to a third transistor drain at a third output node, and a switchable fourth source termination resistor coupled to a fourth transistor drain at a fourth output node. The internal format signal is demultiplexed to the first configurable driver circuit or the second configurable driver circuit.

In a further example, a circuit includes a first configurable receiver circuit, a second configurable receiver circuit, a multiplexer coupled to the first configurable receiver circuit and the second configurable receiver circuit, and a configurable driver circuit coupled to the multiplexer. The first configurable receiver circuit includes a first input node, a second input node, a switchable first resistor coupled to the first input node, a switchable second resistor coupled to the second input node, a switchable first self-biasing circuit coupled to the first input node and the second input node, and a first supply voltage coupled to the switchable first resistor and the switchable second resistor. The first amplifier generates a first internal format signal.

The second configurable receiver circuit includes a third input node, a fourth input node, a switchable third resistor coupled to the third input node, a switchable fourth resistor coupled to the fourth input node, a switchable second self-biasing circuit coupled to the third input node and the fourth input node, and a second supply voltage coupled to the switchable third resistor and the switchable fourth resistor. A second amplifier generates a second internal format signal. The multiplexer receives the first internal format signal or the second internal format signal. The configurable driver circuit coupled to the multiplexer receives the first internal format signal or the second internal format signal. The configurable driver circuit includes a first transistor and a second transistor in a differential pair configuration, a switchable first source termination resistor coupled to a first transistor drain at a first output node, a switchable second source termination resistor coupled to a second transistor drain at a second output node, and a current source coupled to a first transistor source and a second transistor source.

In a further example, a circuit includes a configurable receiver circuit, a multiplexer or demultiplexer coupled to the configurable receiver circuit, and a configurable driver circuit. The configurable receiver circuit includes a first input node, a second input node, a first resistor having a first terminal coupled to the first input node and a second terminal coupled to a first switch, and a second resistor having a third terminal coupled to the second input node and a fourth terminal coupled to a second switch. A self-biasing circuit is coupled to the first input node and the second input node via a third switch and a fourth switch. A first supply voltage is coupled to the first switch and the second switch. The first switch, second switch, third switch, and fourth switch are configured to allow the configurable receiver circuit to receive a DC-coupled open drain current signal or an AC-coupled CML driver signal. The configurable receiver circuit further includes an amplifier for generating an internal format signal. The multiplexer or demultiplexer coupled to the configurable receiver circuit receives the internal format signal.

The configurable driver circuit includes a first transistor having a first transistor gate, a first transistor source, and a first transistor drain. The configurable driver circuit further includes a second transistor having a second transistor gate, a second transistor source, and a second transistor drain. A first input terminal is coupled to the first transistor gate and a second input terminal is coupled to the second transistor gate. The first input terminal and the second input terminal are coupled to the multiplexer or demultiplexer. The configurable driver circuit further includes a first source termination resistor having a fifth terminal coupled to the first transistor drain and a sixth terminal coupled to a fifth switch. A second source termination resistor has a seventh terminal coupled to the second transistor drain and an eighth terminal coupled to a sixth switch. A second supply voltage is coupled to the fifth switch and the sixth switch. A first output node is coupled to the first transistor drain, a second output node is coupled to the second transistor drain, and a current source is coupled to the first transistor source and the second transistor source. The fifth switch and the sixth switch are configurable to operate the configurable driver circuit as a CML driver circuit or an open drain driver circuit.

In a further example, a circuit includes a receiver circuit, a demultiplexer circuit, a first driver circuit, and a second driver circuit. The receiver circuit includes a first input node, a second input node, a first resistor coupled to the first input node, and a second resistor coupled to the second input node. A supply voltage is coupled to the first resistor and the second resistor. An amplifier generates an internal format signal. The demultiplexer is coupled to the receiver circuit for receiving and routing the internal format signal.

The first driver circuit is coupled to the demultiplexer and includes a first transistor and a second transistor in a first differential pair configuration. A first source termination resistor is coupled to a first transistor drain at a first output node and a second source termination resistor is coupled to a second transistor drain at a second output node. The second driver circuit is coupled to the demultiplexer and includes a third transistor and a fourth transistor in a second differential pair configuration. The internal format signal is demultiplexed to the first driver circuit or the second driver circuit.

In a further example, a circuit includes a first receiver circuit, a second receiver circuit, a multiplexer, and a driver circuit. The first receiver circuit includes a first input node, a second input node, a first resistor coupled to the first input node, and a second resistor coupled to the second input node. A self-biasing circuit is coupled to the first input node and the second input node, and a first supply voltage is coupled to the first resistor and the second resistor. A first amplifier generates a first internal format signal. The second receiver circuit includes a third input node, a fourth input node, a third resistor coupled to the third input node, and a fourth resistor coupled to the fourth input node. A second supply voltage is coupled to the third resistor and the fourth resistor, and a second amplifier generates a second internal format signal.

A multiplexer is coupled to the first receiver circuit and the second receiver circuit for receiving the first internal format signal or the second internal format signal. A driver circuit is coupled to the multiplexer for receiving the first internal format signal or the second internal format signal. The driver circuit includes a first transistor and a second transistor in a differential pair configuration. A first source termination resistor is coupled to a first transistor drain at a first output node and a second source termination resistor is coupled to a second transistor drain at a second output node. A current source is coupled to a first transistor source and a second transistor source. In a further example, the driver circuit includes a first transistor and a second transistor in a differential pair configuration and a current source coupled to a first transistor source and a second transistor source.

The circuits and methods described herein provide for multi-format digital A/V signal switching, and offer the flexibility of receiving, transmitting, and switching different signaling formats used by different interface protocols. By leveraging the switching functions as described, display and other electronic devices can be manufactured more efficiently and economically. FIG. 1 illustrates a diagram of a digital A/V transmission PHY signaling format conversion system 100 to realize digital A/V switching for different digital A/V signaling formats in one example. Digital A/V transmission PHY signaling format conversion system 100 can receive signals in a variety of formats and convert the received signals to a variety of output formats. As shown in FIG. 1, x configurable multi-format receivers RCV 1 6, RCV 2 12, and RCV x 18 receive x differential input signals IN1+2, IN1−4, IN2+8, IN2−10, Inx+14, and Inx−16, respectively, where the number of input signals x is greater than or equal to one. Since high speed is a necessity for current digital A/V devices, differential signaling is the accepted de facto electrical signaling. In this prospect, all the receiving and transmitting functions in FIG. 1 are drawn in differential signals. As discussed in further detail below, each configurable multi-format receiver RCV 1 6, RCV 2 12, and RCV x 18 may be configured to receive an A/V signal in a different PHY signaling format. In one example, multiple signals may be received simultaneously. Regardless of the PHY signaling format received, each configurable multi-format receiver RCV 1 6, RCV 2 12, and RCV x 18 converts the received differential input signals IN1+2, IN1−4, IN2+8, IN2−10, Inx+14, and Inx−16 to internal format differential signals 7, 13, 19 respectively.

A multiplexer and/or demultiplexer block 20 or other switching circuit receives the output from configurable multi-format receivers RCV 1 6, RCV 2 12, and RCV x 18. Depending upon the application, multiplexer and/or demultiplexer block 20 multiplexes or demultiplexes the internal format differential signals 7, 13, and 19 to one or more configurable multi-format output drivers.

In the example shown in FIG. 1, the internal format differential signals 7, 13, 19 are multiplexed or demultiplexed to y configurable multi-format output drivers DRV1 22, DRV2 28, and DRVy 34, where the number of output drivers y is greater than or equal to one depending upon the application. Configurable multi-format output drivers DRV1 22, DRV2 28, and DRVy 34 convert the received internal format differential signals 7, 13, 19 to a desired PHY signaling format as described in further detail below. Configurable multi-format output driver DRV1 22 outputs a differential output signal OUT1+24, OUT1−26. Configurable multi-format output driver DRV2 28 outputs a differential output signal OUT1+30, OUT1−32. Configurable multi-format output driver DRVy 34 outputs a differential output signal OUT1+36, OUT1−38.

Figure 4:
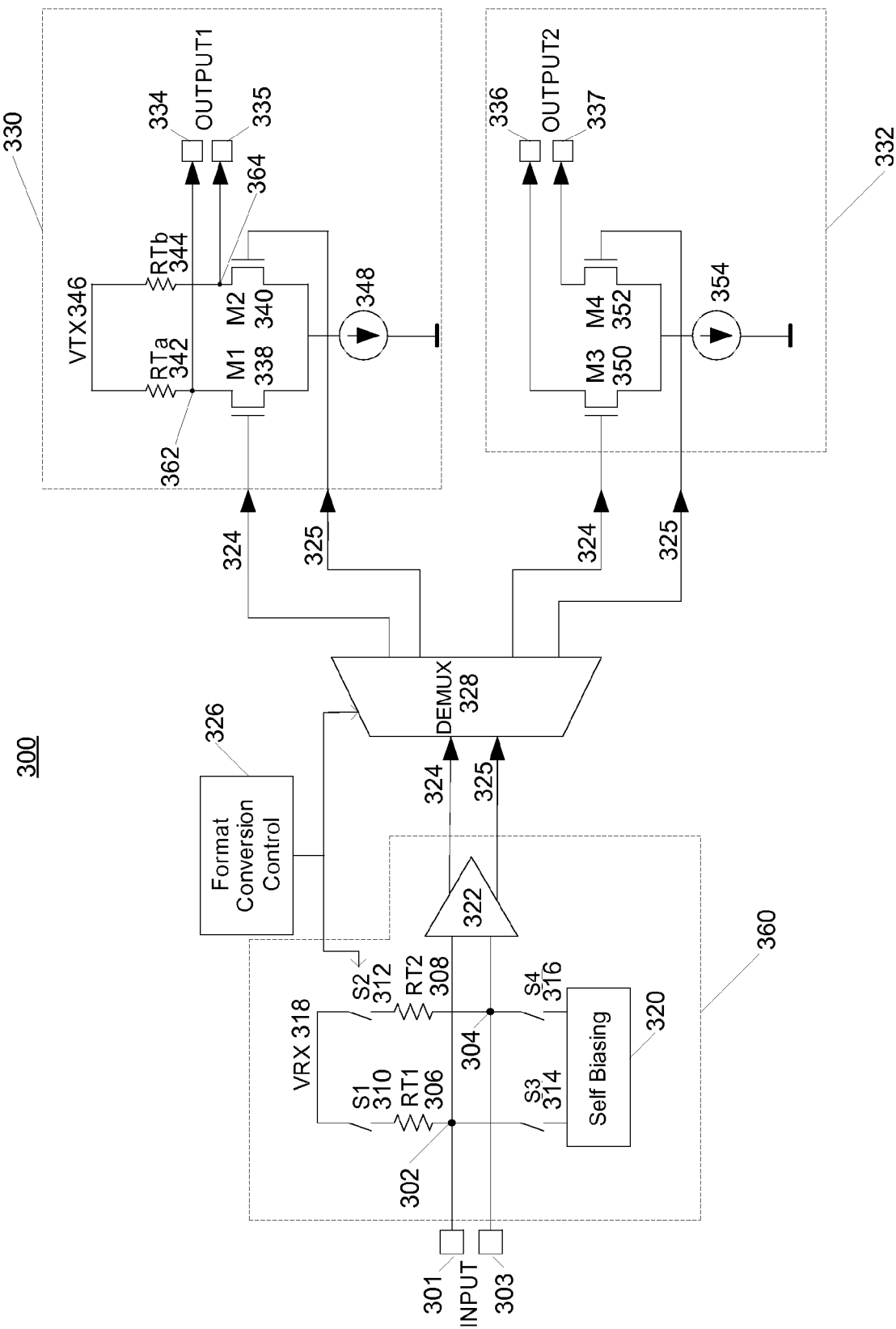
FIG. 4 illustrates a multiple format de-multiplexing application in one example of the invention.
Figure 5:
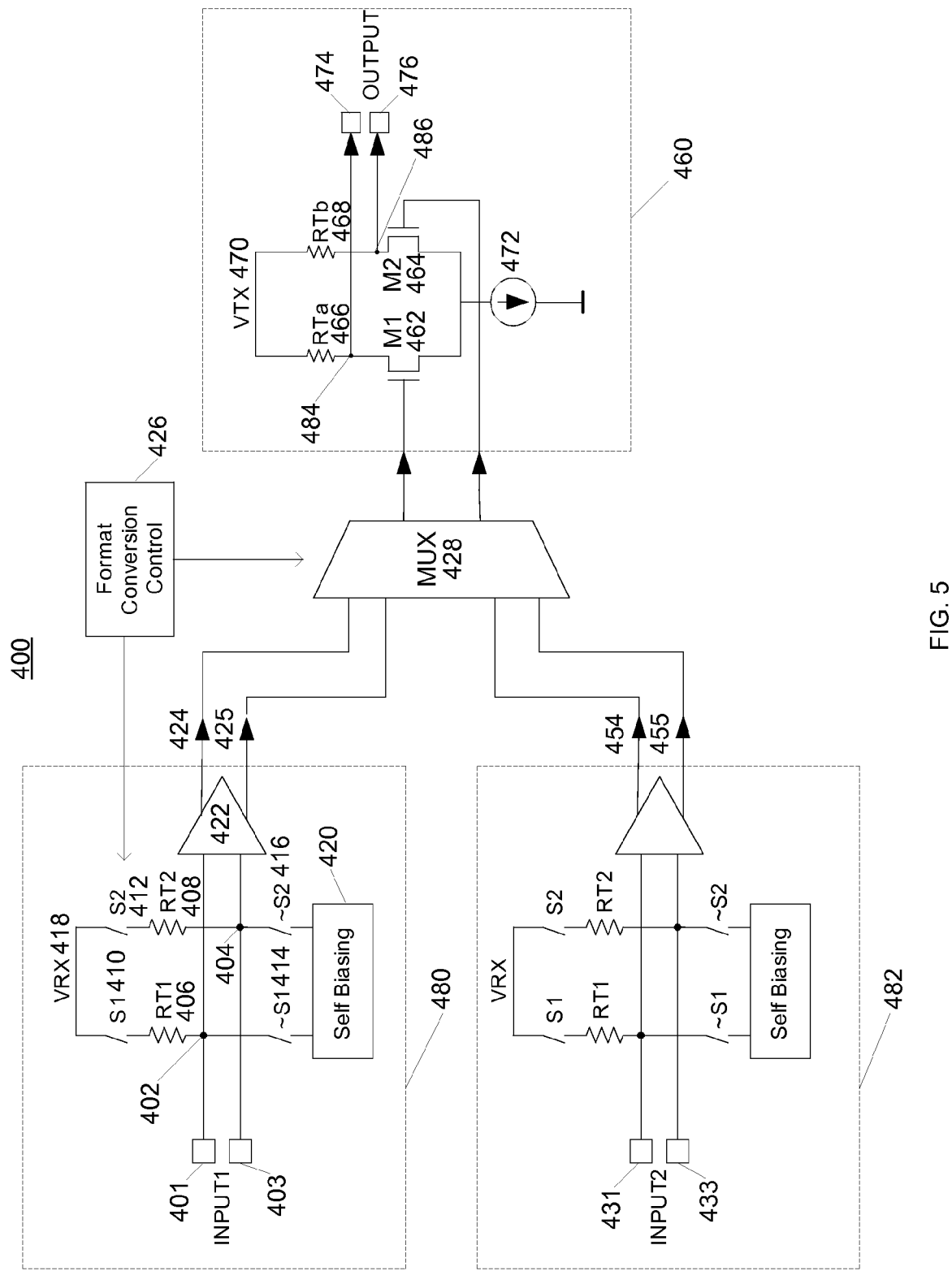
FIG. 5 illustrates a multiple format multiplexing application in one example of the invention.

As illustrated in the examples shown in FIG. 4 and FIG. 5, the digital A/V transmission PHY signaling format conversion system 100 can be configured in numerous ways depending on the desired application. In one example of the invention, the digital A/V transmission PHY signaling format conversion system 100 is used to convert electrical signals between the PHY signaling formats used by, for example, the DisplayPort, HDMI and DVI A/V interface standards. The PHY level physical electrical signaling is different for these standards, making them incompatible to each other. Digital A/V transmission PHY signaling format conversion system 100 may be used to receive and convert different PHY signaling formats to the PHY signaling format which can be received by the end receiving devices (usually referred to in the art as the SINK device), thereby solving the incompatibility problem resulting from different A/V standards.

For example, the PHY signaling format used by DVI and HDMI is open drain DC coupling signaling. DisplayPort uses AC-coupled CML double termination signaling. HDMI is also proposing a possible AC-coupling scheme. Each configurable multi-format receivers RCV 1 6, RCV 2 12, and RCV x 18 is capable of being configured to receive different PHY signaling format signals, such as DC-coupled open drain current signals as used in HDMI, DVI or AC-coupled CML driver signals, as used in DisplayPort. Upon receiving the input signals, a receiver then converts the signals to a universal internal signal for the multiplexing or de-multiplexing by multiplexer and/or demultiplexer block 20 to direct the signals to the desired driver. For example, the universal internal signal may be a CMOS signal, CML (current mode logic) signal, or other signal format. The driver then converts the signals into the required PHY signaling format as specified by the desired interface standard.

Figure 2:
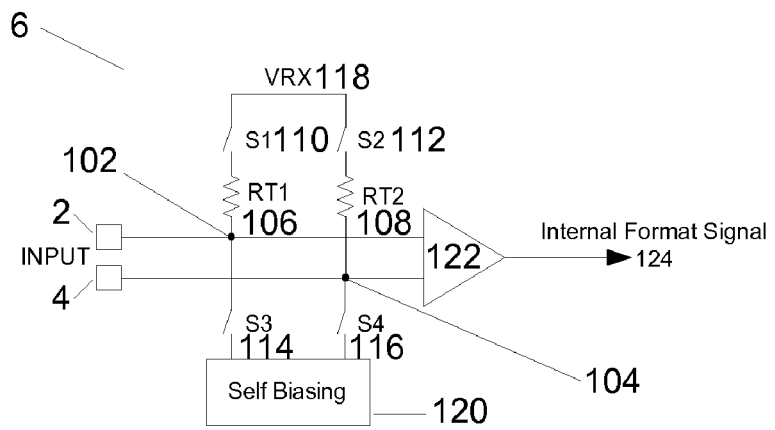
FIG. 2 illustrates one example of configurable multi-format receiver configurable to receive both DC-coupled open drain current signals and AC-coupled CML driver signals in one example of the invention.

FIG. 2 illustrates one example of configurable multi-format RCV 1 6 configurable to receive either DC-coupled open drain current signals or AC-coupled CML driver signals.

Configurable multi-format RCV 1 6 receives a differential input signal 2, 4 at a first input node 102 and second input node 104 respectively. Input node 102 is coupled to a self-biasing circuit 120 via a switch S3 114. Input node 104 is coupled to self-biasing circuit 120 via a switch S4 116. A first terminal of a switched (also referred to herein as "switchable") resistor RT1 106 is coupled to input node 102. The second terminal of switched resistor RT1 106 is coupled to a switch S1 110. A first terminal of a switched resistor RT2 108 is coupled to input node 104. The second terminal of switched resistor RT2 108 is coupled to a switch S2 112. Both switch S1 110 and switch S2 112 are coupled to a supply voltage VRX 118. Input node 102 and Input node 104 coupled the received differential input signal 2, 4 to an amplifier 122, which converts the received signal to an internal format signal 124. For example, internal format signal 124 may be a CMOS signal, CML signal, or other desired format signal.

In operation, switches S1 110, S2 112, S3 114, and S4 116 are selectively controlled to configure configurable multi-format RCV 1 6 to receive either a DC-coupled open drain current signal or AC-coupled CML driver signal. For example, to receive a DC-coupled open drain current signal (e.g., DVI or HDMI signaling), VRX 118 is set to a 3.3V supply. Switches S1 110 and S2 112 are turned on. RT1 106 and RT2 108 are 50-ohm termination resistors. Switches S3 114 and S4 116 are turned off. In this arrangement, the input common-mode voltage is set by the open drain current flowing out the RT1 106 and RT2 108.

Alternatively, to receive an AC-coupled CML driver signal (e.g. DisplayPort or AC-coupled HDMI signaling), switches S1 110, S2 112, S3 114, and S4 116 are all turned on. VRX 118 can be used to either set the common-mode voltage (overriding the self biasing circuit 120), or to provide AC ground. In the case where VRX 118 is set as an AC ground, the self biasing circuit 120 determines the input common-mode voltage. When the common-mode voltage is set externally by the VRX 118, the switches S3 114 and S4 116 can also be turned off. The receiving amplifier 122 converts the input signals to the internal CMOS or CML signaling for switching processing.

Figure 3:
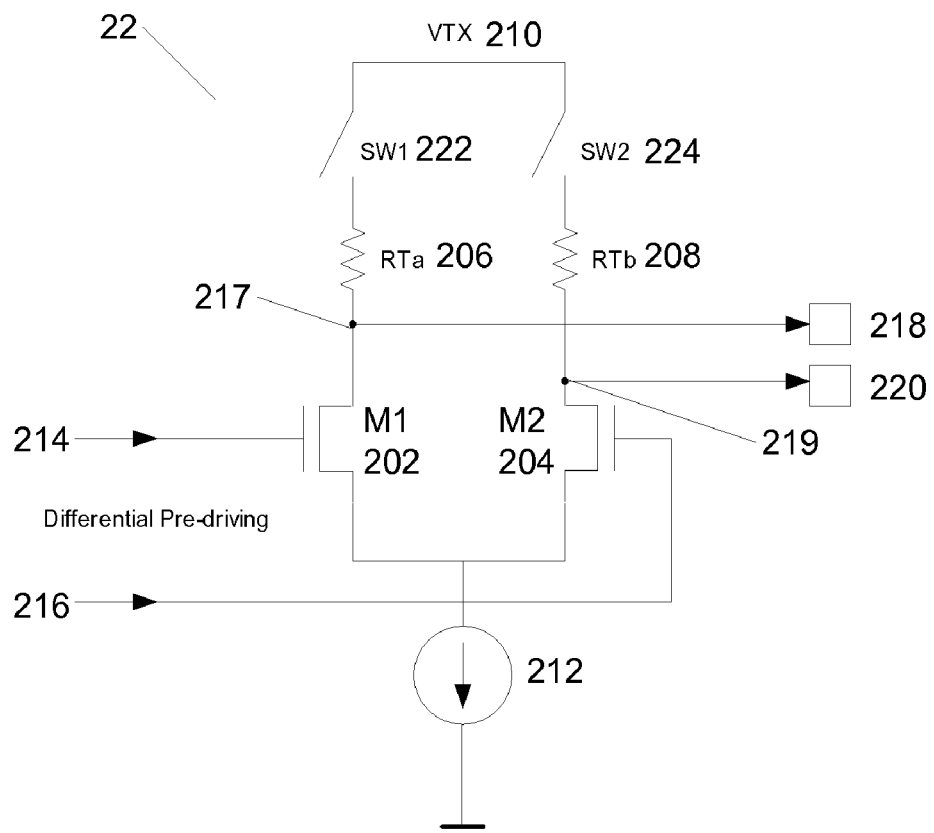
FIG. 3 illustrates one example of a configurable multiple format driver which can be configured to transmit both DC-coupled open drain signals and AC-coupled CML driver signals in one example of the invention.

FIG. 3 illustrates one example of a configurable multiple format driver DRV1 22 which can be configured to transmit either DC-coupled open drain signals or AC-coupled CML driver signals. The configurable multiple format driver DRV1

22 includes a differential pair of transistors NMOS transistor M1 202, NMOS transistor M2 204, switchable source termination resistors RTa 206, RTb 208, and a current source $I_{sink}$ 212 that feeds the sources of the differential transistor pair. The configurable multiple format driver DRV1 22 utilizes NMOS transistors M1 202 and M2 204 as a differential logic pair. The gate electrode of NMOS transistor M1 202 is connected to an input line DIP 214, the source electrode is connected to constant-current source $I_{sink}$ 212, and the drain electrode is connected to an output node 217 connected to chip pad DON 218 and source termination resistor RTa 206. The gate electrode of NMOS transistor M2 204 is connected to input line DIN 216, the source electrode is connected to constant current source $I_{sink}$ 212, and the drain electrode is connected to an output node 219 connected to chip pad DOP 220 and source termination resistor RTb 208. The configurable multiple-format driver DRV1 22 receives a differential pre-driving input signal at input line DIP 214 and input line DIN 216. A supply voltage $V_{TX}$ 210 is coupled to switchable source termination resistor RTa 206 via a switch SW1 222 and coupled to switchable source termination resistor RTb 208 via a switch SW2 224. In one example, switch SW1 222 and switch SW2 224 are implemented by semiconductor transistors or by metal change option to perform equivalent switch functions.

In operation, configurable multiple format driver DRV1 22 is configured to operate as a CML driver circuit if switch SW1 222 and switch SW2 224 are closed, in which case switchable source termination resistor RTa 206, switchable source termination resistor RTb 208, and supply voltage $V_{TX}$ 210 are included in the circuit. Switchable source termination resistor RTa 206 and RTb 208 are connected to the output nodes 217 and 219, respectively. In one example, switchable source termination resistor RTa 206 and RTb 208 each have a value of 50 ohms. In this configuration, the configurable multiple format driver DRV1 22 may be used to implement an AC-coupled double termination data transmission link, such as that used by Display Port and AC-coupled HDMI signals. The source termination resistors are used to reduce the reflections and thereby improve signal quality in high speed data transmission over wireline applications. Voltage supply $V_{TX}$ 210 is used to set the output common-mode voltage if needed. It also serves as the current supply source to the driver. To realize the different drivers, the tail current is also accordingly changed to meet different signaling requirements.

Configurable multiple format driver DRV1 22 is configurable to operate as a DC-coupled open drain driver if switch SW1 222 and switch SW2 224 are open, in which case switchable source termination resistor RTa 206, switchable source termination resistor RTb 208, and supply voltage $V_{RX}$ 210 are removed from the circuit. In this configuration, the configurable multiple format driver DRV1 22 may be used to implement a DC-coupled data transmission link, such as that used by HDMI or DVI.

FIG. 4 illustrates a multiple format de-multiplexing application of the general digital A/V transmission PHY signaling format conversion system 100 shown in FIG. 1. Shown in FIG. 4 is a multi-format de-multiplexing conversion system 300 in which one received input is selectively demultiplexed to two or more output drivers. For example, de-multiplexing system may receive an AC-coupled DisplayPort input, AC-coupled HDMI input, or DC-coupled HDMI or DVI input, and then selectively de-multiplex the signal onto different ports, such as an open drain HDMI/DVI output and/or DisplayPort CML output. For example, in one application, multi-format de-multiplexing conversion system 300 may reside on a personal computer with a graphics card providing the receive input signal and each output driver may be used to couple to a different display device.

Referring to FIG. 4, a configurable multi-format receiver 360 is configurable to receive both DC-coupled open drain current signals and AC-coupled CML driver signals. Configurable multi-format receiver 360 receives a differential input signal 301, 303 at a first input node 302 and second input node 304 respectively. Input node 302 is coupled to a self-biasing circuit 320 via a switch S3 314. Input node 304 is coupled to self-biasing circuit 320 via a switch S4 316. A first terminal of a switched resistor RT1 306 is coupled to input node 302. The second terminal of switched resistor RT1 306 is coupled to a switch S1 310. A first terminal of a switched resistor RT2 308 is coupled to input node 304. The second terminal of switched resistor RT2 308 is coupled to a switch S2 312. Both switch S1 310 and switch S2 312 are coupled to a supply voltage VRX 318. Input node 302 and Input node 304 coupled the received differential input signal 301, 303 to an amplifier 322, which converts the received signal to an internal format signal 324, 325. For example, internal format signal 324, 325 may be a CMOS signal, CML signal, or other desired format signal.

In operation, S1 310, S2 312, S3 314, and S4 316 are selectively controlled by a format conversion control block 326 to configure configurable multi-format receiver 360 to receive either a DC-coupled open drain current signal or AC-coupled CML driver signal. For example, to receive a DC-coupled open drain current signal, voltage supply VRX 318 is set to a 3.3V supply. Switches S1 310 and S2 312 are turned on RT1 306 and RT2 308 are 50-ohm termination resistors. Switches S3 314 and S4 316 are turned off. The input common-mode voltage is then set by the open drain current flowing out the RT1 306 and RT2 308.

Alternatively, to receive an AC-coupled CML driver signal, switches S1 310, S2 312, S3 314, and S4 316 are all turned on. VRX 318 can be used to either set the common-mode voltage, overriding the self biasing circuit 320, or to provide AC ground. In the case where VRX 318 is set as an AC ground, the self biasing circuit 320 determines the input common-mode voltage. When the common-mode voltage is set externally by the VRX 318, the switches S3 314 and S4 316 can also be turned off.

The receiving amplifier 322 converts the input signals to an internal format signal 324, 325 which is output to a demultiplexer 328 for switching processing. Demultiplexer 328 is controlled by format conversion control block 326 to route internal format signal 324, 325 to either a CML driver 330 or an open drain driver 332, or both. Format conversion control block 326 also controls the switching state of switches S1 310, S2 312, S3 314, and S4 316. In one example, format conversion control block 326 receives an external input, such as a user input.

CML driver 330 is a configurable multiformat driver as shown in FIG. 3 configured to receive internal format signal 324, 325 and output an AC-coupled CML driver signal at an output chip pad DON 334, DOP 335. The CML driver 330 includes a differential pair of transistors NMOS transistor M1 338, NMOS transistor M2 340, switchable source termination resistors RTa 342, RTb 344, and a current source $I_{sink}$ 348 that feeds the sources of the differential transistor pair. The CML driver 330 utilizes NMOS transistors M1 338 and M2 340 as a differential logic pair. The gate electrode of NMOS transistor M1 338 is connected to an output of demultiplexer 328 to receive internal format signal 324, the source electrode is connected to constant-current source $I_{sink}$ 348, and the drain electrode is connected to an output node 362 connected to chip pad DON 334 and source termination resistor RTa 342.

The gate electrode of NMOS transistor M2 340 is connected to an output of demultiplexer 328 to receive internal format signal 325, the source electrode is connected to constant current source $I_{sink}$ 348, and the drain electrode is connected to an output node 364 connected to chip pad DOP 335 and source termination resistor RTb 344. The CML driver 330 receives differential pre-driving internal format signal 324, 325. A supply voltage $V_{TX}$ 346 is coupled to switchable source termination resistor RTa 342 and coupled to switchable source termination resistor RTb 344.

Switchable source termination resistor RTa 342 and RTb 344 are connected to the output nodes 362 and 364, respectively. In one example, switchable source termination resistor RTa 342 and RTb 344 each have a value of 50 ohms. In this configuration, the CML driver 330 may be used to implement an AC-coupled double termination data transmission link, such as that used by Display Port and AC-coupled HDMI signals.

Open drain driver 332 is a configurable multiformat driver as shown in FIG. 3 configured to receive internal format signal 324, 325 and output an DC-coupled signal at an output chip pad DON 336, DOP 337. Open drain driver 332 includes a differential pair of transistors NMOS transistor M3 350, NMOS transistor M4 352, and a current source $I_{sink}$ 354 that feeds the sources of the differential transistor pair. The open drain driver 332 utilizes NMOS transistors M3 350 and M4 352 as a differential logic pair. The gate electrode of NMOS transistor M3 350 is coupled to demultiplexer 328, the source electrode is connected to constant-current source $I_{sink}$ 354, and the drain electrode is connected to output chip pad DON 336. The gate electrode of NMOS transistor M4 352 is coupled to demultiplexer 328, the source electrode is connected to constant current source $I_{sink}$ 354, and the drain electrode is connected to output chip pad DOP 337. The open drain driver 332 receives differential pre-driving internal format signal 324, 325 from demultiplexer 328 and outputs a DC-coupled signal at output chip pads DON 336, DOP 337.

Referring again to FIG. 4, in a further example, multi-format receiver 360 is replaced with a single format receiver that receives either DC coupled open drain current signals or AC coupled CML driver signals, but not both. For example, to receive AC coupled CML driver signals, switches S1 310, S2 312, S3 314, and S4 316 are removed and replaced with straight connecting wire. To receive DC coupled open drain current signals, switches S1 310 and S2 312 are replaced with straight wire and switches S3 314 and S4 316 are removed along with self biasing circuit 320. Similarly, rather than being implementations of a configurable driver circuit shown in FIG. 3, CML driver 330 and open drain driver 332 are implemented directly as shown in FIG. 4 without the use of switchable components or switches.

FIG. 5 illustrates a multiple format multiplexing application of the general digital A/V transmission PHY signaling format conversion system 100 shown in FIG. 1. For multi-port inputs, shown as INPUT1 and INPUT2 for simplicity, the signals at each input port can be one of the PHY signaling formats used by AC-coupled DisplayPort, AC-coupled HDMI, DC-coupled DVI and DC-coupled HDMI. All inputs are converted into internal format signals, such as CMOS or CML signaling, before multiplexing. The inputs are then multiplexed onto a CML driver 460 which can be a dual HDMI and DisplayPort receiver. In one application, the example multi-format multiplexing system 400 shown in FIG. 5 provides the front end of multi-format interfacing receiver which can sit in display devices such TV sets and monitors.

Referring to FIG. 5, two configurable multi-format receivers 480, 482 are configurable to receive either DC-coupled open drain current signals or AC-coupled CML driver signals. Although only two receivers are shown, in this multi-format interfacing receiver application there may be additional receivers. Configurable multi-format receiver 480 receives a differential input signal 401, 403 at a first input node 402 and second input node 404 respectively. Input node 402 is coupled to a self-biasing circuit 420 via a switch S3 414. Input node 404 is coupled to self-biasing circuit 420 via a switch S4 416. A first terminal of a switched resistor RT1 406 is coupled to input node 402. The second terminal of switched resistor RT1 406 is coupled to a switch S1 410. A first terminal of a switched resistor RT2 408 is coupled to input node 404. The second terminal of switched resistor RT2 408 is coupled to a switch S2 412. Both switch S1 410 and switch S2 412 are coupled to a supply voltage VRX 418. Input node 402 and Input node 404 coupled the received differential input signal 401, 403 to an amplifier 422, which converts the received signal to an internal format signal 424, 425. For example, internal format signal 424, 425 may be a CMOS signal, CML signal, or other desired format signal.

In operation, switches S1 410, S2 412, S3 414, and S4 416 are selectively controlled by a format conversion control block 426 to configure configurable multi-format receiver 480 to receive either a DC-coupled open drain current signal or AC-coupled CML driver signal. For example, to receive a DC-coupled open drain current signal (e.g., DVI or HDMI signaling), VRX 418 is set to a 3.3V supply. Switches S1 410 and S2 412 are turned on. RT1 406 and RT2 408 are 50-ohm termination resistors. Switches S3 414 and S4 416 are turned off. The input common-mode voltage is then set by the open drain current flowing out the RT1 406 and RT2 408.

Alternatively, to receive an AC-coupled CML driver signal, switches S1 410, S2 412, S3 414, and S4 416 are all turned on. VRX 418 can be used to either set the common-mode voltage (overriding the self biasing circuit 420), or to provide AC ground. In the case where VRX 418 is set as an AC ground, the self biasing circuit 420 determines the input common-mode voltage. When the common-mode voltage is set externally by the VRX 418, the switches S3 414 and S4 416 can also be turned off.

The receiving amplifier 422 converts the input signals to the internal CMOS or CML signaling and outputs internal format signal 424, 425 to a multiplexer 428 for switching processing.

Configurable multi-format receiver 482 operates in a manner similar to that of multi-format receiver 480. Configurable multi-format receiver 482 receives input signal 431, 433 and outputs internal format signal 454, 455 to multiplexer 428 for switching processing.

Multiplexer 428 is controlled by format conversion control block 426 to selectively route either internal format signal 424, 425 or internal format signal 454, 455 to a CML driver 460. Format conversion control block 426 also controls the switching state of the switches in configurable multi-format receiver 480 and configurable multi-format receiver 482. In one example, format conversion control block 426 may receive an external input, such as a user input, to select either internal format signal 424, 425 or internal format signal 454, 455 to route to CML driver 460.

CML driver 460 is a configurable multi-format driver as shown in FIG. 3 configured to receive an internal format signal from multiplexer 428 and output an AC-coupled signal at output pad DON 474, DOP 476. In the example shown in FIG. 5, CML driver receives either internal format signal 424, 425 or internal format signal 454, 455. As described in reference to FIG. 1, CML driver 460 can be replaced by a configurable multiformat driver which has been configured to output a DC-coupled signal.

The CML driver 460 includes a differential pair of transistors NMOS transistor M1 462, NMOS transistor M2 464, switchable source termination resistors RTa 466, RTb 468, and a current source $I_{sink}$ 472 that feeds the sources of the differential transistor pair. The CML driver 460 utilizes NMOS transistors M1 462 and M2 464 as a differential logic pair. The gate electrode of NMOS transistor M1 462 is connected to an output of multiplexer 428, the source electrode is connected to constant-current source $I_{sink}$ 472, and the drain electrode is connected to an output node 484 connected to chip pad DON 474 and source termination resistor RTa 466. The gate electrode of NMOS transistor M2 464 is connected to an output of multiplexer 428, the source electrode is connected to constant current source $I_{sink}$ 472, and the drain electrode is connected to an output node 486 connected to chip pad DOP 476 and source termination resistor RTb 468. The CML driver 460 receives differential pre-driving input signal 424, 425 or 454, 454 depending upon the control of multiplexer 428 by format conversion control block 426. A supply voltage $V_{TX}$ 470 is coupled to switchable source termination resistor RTa 466 and coupled to switchable source termination resistor RTb 468.

Switchable source termination resistor RTa 466 and RTb 468 are connected to the output nodes 484 and 486, respectively. In one example, switchable source termination resistor RTa 466 and RTb 468 each have a value of 50 ohms. In this configuration, the CML driver 460 may be used to implement an AC-coupled double termination data transmission link, such as that used by Display Port and AC-coupled HDMI signals.

Referring again to FIG. 5, in a further example, multi-format receiver 480 and multi-format receiver 482 are implemented directly as single format receivers. For example, multiple format receiver 480 is replaced with a single format receiver to receive AC coupled CML driver signals. Switches S1 410, S2 412, S3 414, and S4 416 are removed and replaced with straight connecting wire. For example, multiple format receiver 482 is replaced with a single format receiver to receive DC coupled open drain current signals. Switches S1 440 and S2 442 are replaced with straight wire and switches S3 444 and S4 446 are removed along with self biasing circuit 450. Similarly, rather than being an implementation of a configurable driver circuit shown in FIG. 3, CML driver 460 is implemented directly as shown in FIG. 5 without the use of switches. In a further example, CML driver circuit 460 is replaced with an open drain driver circuit implemented directly without switchable components similar to open drain driver 332 shown in FIG. 4.

Although example circuit configurations have been described in certain example of the invention, one of ordinary skill in the art will recognize that except as otherwise described herein other configurations and components may be used to perform similar functions. For example, although supply referenced driver circuits are described, ground referenced driver circuits may be used. While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A circuit comprising:
   a configurable receiver circuit comprising:
      a first input node;
      a second input node;
      a switchable first resistor coupled to the first input node;
      a switchable second resistor coupled to the second input node;
      a switchable self-biasing circuit coupled to the first input node and the second input node;
      a supply voltage coupled to the switchable first resistor and the switchable second resistor;
      an amplifier for generating an internal format signal;
   a multiplexer or demultiplexer coupled to the configurable receiver circuit for receiving the internal format signal; and
   a configurable driver circuit coupled to the multiplexer or demultiplexer for receiving the internal format signal, comprising:
      a first transistor and a second transistor in a differential pair configuration;
      a switchable first source termination resistor coupled to a first transistor drain at a first output node;
      a switchable second source termination resistor coupled to a second transistor drain at a second output node; and
      a current source coupled to a first transistor source and a second transistor source.

2. The circuit of claim 1, wherein the configurable receiver circuit is configurable to receive a DC-coupled open drain current signal or an AC-coupled CML driver signal.

3. The circuit of claim 2, wherein the DC-coupled open drain current signal is a DVI or HDMI signal and the AC-coupled CML driver signal is a DisplayPort signal or AC-coupled HDMI signal.

4. The circuit of claim 1, wherein the internal format signal is a CMOS signal or a CML signal.

5. The circuit of claim 1, wherein the switchable first resistor is switched into the circuit, the switchable second resistor is switched into the circuit, and the switchable self-biasing circuit is switched out of the circuit to configure the configurable receiver circuit to receive a DC-coupled open drain current signal.

6. The circuit of claim 1, wherein the switchable first resistor is switched into the circuit, the switchable second resistor is switched into the circuit, and the switchable self-biasing circuit is switched into the circuit to configure the configurable receiver circuit to receive an AC-coupled CML driver signal.

7. The circuit of claim 1, wherein the configurable driver circuit is configurable to transmit a DC-coupled open drain signal or an AC-coupled CML driver signal.

8. The circuit of claim 1, wherein the switchable first source termination resistor is switched into the circuit and the switchable second source termination resistor is switched into the circuit to configure the configurable driver circuit to operate as a CML driver circuit.

9. The circuit of claim 1, wherein the switchable first source termination resistor is switched out of the circuit and the switchable second source termination resistor is switched out of the circuit to configure the configurable driver circuit to operate as an open drain driver circuit.

10. A circuit comprising:
    a configurable receiver circuit comprising:
       a first input node;
       a second input node;
       a switchable first resistor coupled to the first input node;

a switchable second resistor coupled to the second input node;
a switchable self-biasing circuit coupled to the first input node and the second input node;
a supply voltage coupled to the switchable first resistor and the switchable second resistor;
an amplifier for generating an internal format signal;
a demultiplexer coupled to the configurable receiver circuit for receiving and routing the internal format signal;
a first configurable driver circuit coupled to the demultiplexer comprising:
a first transistor and a second transistor in a first differential pair configuration;
a switchable first source termination resistor coupled to a first transistor drain at a first output node;
a switchable second source termination resistor coupled to a second transistor drain at a second output node; and
a second configurable driver circuit coupled to the demultiplexer comprising:
a third transistor and a fourth transistor in a second differential pair configuration;
a switchable third source termination resistor coupled to a third transistor drain at a third output node; and
a switchable fourth source termination resistor coupled to a fourth transistor drain at a fourth output node, wherein the internal format signal is demultiplexed to the first configurable driver circuit or the second configurable driver circuit.

11. The circuit of claim 10, further comprising a format conversion control circuit for controlling the demultiplexer and controlling the switchable first resistor, switchable second resistor, and switchable self-biasing circuit.

12. The circuit of claim 10, wherein the configurable receiver circuit is configurable to receive a DC-coupled open drain current signal or an AC-coupled CML driver signal.

13. The circuit of claim 12, wherein the DC-coupled open drain current signal is a DVI or HDMI signal and the AC-coupled CML driver signal is a DisplayPort signal.

14. The circuit of claim 10, wherein the internal format signal is a CMOS signal or a CML signal.

15. The circuit of claim 10, wherein the switchable first resistor is switched into the circuit, the switchable second resistor is switched into the circuit, and the switchable self-biasing circuit is switched out of the circuit to configure the configurable receiver circuit to receive a DC-coupled open drain current signal.

16. The circuit of claim 10, wherein the switchable first resistor is switched into the circuit, the switchable second resistor is switched into the circuit, and the switchable self-biasing circuit is switched into the circuit to configure the configurable receiver circuit to receive an AC-coupled CML driver signal.

17. The circuit of claim 10, wherein the first configurable driver circuit and the second configurable driver circuit are configurable to transmit a DC-coupled open drain signal or an AC-coupled CML driver signal.

18. The circuit of claim 10, wherein the switchable first source termination resistor is switched into the circuit and the switchable second source termination resistor is switched into the circuit to configure the first configurable driver circuit to operate as a CML driver circuit.

19. The circuit of claim 10, wherein the switchable third source termination resistor is switched out of the circuit and the switchable fourth source termination resistor is switched out of the circuit to configure the second configurable driver circuit to operate as an open drain driver circuit.

20. A circuit comprising:
a first configurable receiver circuit comprising:
a first input node;
a second input node;
a switchable first resistor coupled to the first input node;
a switchable second resistor coupled to the second input node;
a switchable first self-biasing circuit coupled to the first input node and the second input node;
a first supply voltage coupled to the switchable first resistor and the switchable second resistor;
a first amplifier for generating a first internal format signal;
a second configurable receiver circuit comprising:
a third input node;
a fourth input node;
a switchable third resistor coupled to the third input node;
a switchable fourth resistor coupled to the fourth input node;
a switchable second self-biasing circuit coupled to the third input node and the fourth input node;
a second supply voltage coupled to the switchable third resistor and the switchable fourth resistor;
a second amplifier for generating a second internal format signal;
a multiplexer coupled to the first configurable receiver circuit and the second configurable receiver circuit for receiving the first internal format signal or the second internal format signal; and
a configurable driver circuit coupled to the multiplexer for receiving the first internal format signal or the second internal format signal, comprising:
a first transistor and a second transistor in a differential pair configuration;
a switchable first source termination resistor coupled to a first transistor drain at a first output node;
a switchable second source termination resistor coupled to a second transistor drain at a second output node; and
a current source coupled to a first transistor source and a second transistor source.

21. The circuit of claim 20, further comprising a format conversion control circuit for controlling the multiplexer to route either the first internal format signal or the second internal format signal to the configurable driver circuit.

22. The circuit of claim 20, wherein the first configurable receiver circuit and the second configurable receiver circuit are configurable to receive a DC-coupled open drain current signal or an AC-coupled CML driver signal.

23. The circuit of claim 22, wherein the DC-coupled open drain current signal is a DVI or HDMI signal and the AC-coupled CML driver signal is a DisplayPort signal.

24. The circuit of claim 20, wherein the switchable first resistor is switched into the circuit, the switchable second resistor is switched into the circuit, and the switchable first self-biasing circuit is switched out of the circuit to configure the first configurable receiver circuit to receive a DC-coupled open drain current signal.

25. The circuit of claim 20, wherein the switchable third resistor is switched into the circuit, the switchable fourth resistor is switched into the circuit, and the switchable second self-biasing circuit is switched into the circuit to configure the second configurable receiver circuit to receive an AC-coupled CML driver signal.

26. The circuit of claim 20, wherein the configurable driver circuit is configurable to transmit a DC-coupled open drain signal or an AC-coupled CML driver signal.

27. The circuit of claim 20, wherein the switchable first source termination resistor is switched into the circuit and the switchable second source termination resistor is switched into the circuit to configure the configurable driver circuit to operate as a CML driver circuit.

28. The circuit of claim 20, wherein the switchable first source termination resistor is switched out of the circuit and the switchable second source termination resistor is switched out of the circuit to configure the configurable driver circuit to operate as an open drain driver circuit.

29. A circuit comprising:
   a configurable receiver circuit comprising:
      a first input node;
      a second input node;
      a first resistor having a first terminal coupled to the first input node and a second terminal coupled to a first switch;
      a second resistor having a third terminal coupled to the second input node and a fourth terminal coupled to a second switch;
      a self-biasing circuit coupled to the first input node and the second input node via a third switch and a fourth switch;
      a first supply voltage coupled to the first switch and the second switch, wherein the first switch, second switch, third switch, and fourth switch are configured to allow the configurable receiver circuit to receive a DC-coupled open drain current signal or an AC-coupled CML driver signal;
   an amplifier for generating an internal format signal;
   a multiplexer or demultiplexer coupled to the configurable receiver circuit for receiving the internal format signal;
   a configurable driver circuit comprising:
      a first transistor having a first transistor gate, a first transistor source, and a first transistor drain;
      a second transistor having a second transistor gate, a second transistor source, and a second transistor drain;
      a first input terminal coupled to the first transistor gate;
      a second input terminal coupled to the second transistor gate, wherein the first input terminal and the second input terminal are coupled to the multiplexer or demultiplexer;
      a first source termination resistor having a fifth terminal coupled to the first transistor drain and a sixth terminal coupled to a fifth switch;
      a second source termination resistor having a seventh terminal coupled to the second transistor drain and an eighth terminal coupled to a sixth switch;
      a second supply voltage coupled to the fifth switch and the sixth switch;
      a first output node coupled to the first transistor drain;
      a second output node coupled to the second transistor drain; and
      a current source coupled to the first transistor source and the second transistor source, wherein the fifth switch and the sixth switch are configurable to operate the configurable driver circuit as a CML driver circuit or an open drain driver circuit.

30. The circuit of claim 29, wherein the first switch, second switch, third switch, fourth switch, fifth switch, and sixth switch comprise transistors.

31. The circuit of claim 29, wherein the DC-coupled open drain current signal is a DVI or HDMI signal and the AC-coupled CML driver signal is a DisplayPort signal.

32. The circuit of claim 29, wherein the internal format signal is a CMOS signal or a CML signal.

33. The circuit of claim 29, wherein the first switch and second switch are closed and the third switch and fourth switch are open to configure the configurable receiver circuit to receive a DC-coupled open drain current signal.

34. The circuit of claim 29, wherein the first switch, second switch, third switch, and fourth switch are closed to configure the configurable receiver circuit to receive an AC-coupled CML driver signal.

35. The circuit of claim 29, wherein the fifth switch and sixth switch are closed to configure the configurable driver circuit to operate as a CML driver circuit.

36. The circuit of claim 29, wherein the fifth switch and sixth switch are open to configure the configurable driver circuit to operate as an open drain driver circuit.

37. A circuit comprising:
   a receiver circuit comprising:
      a first input node;
      a second input node;
      a first resistor coupled to the first input node;
      a second resistor coupled to the second input node;
      a supply voltage coupled to the first resistor and the second resistor;
      an amplifier for generating an internal format signal;
   a demultiplexer coupled to the receiver circuit for receiving and routing the internal format signal;
   a first driver circuit coupled to the demultiplexer comprising:
      a first transistor and a second transistor in a first differential pair configuration;
      a first source termination resistor coupled to a first transistor drain at a first output node;
      a second source termination resistor coupled to a second transistor drain at a second output node; and
   a second driver circuit coupled to the demultiplexer comprising:
      a third transistor and a fourth transistor in a second differential pair configuration, wherein the internal format signal is demultiplexed to the first driver circuit or the second driver circuit.

38. The circuit of claim 37, further comprising a format conversion control circuit for controlling the demultiplexer.

39. The circuit of claim 37, further comprising a self-biasing circuit coupled to the first input node and the second input node.

40. A circuit comprising:
   a first receiver circuit comprising:
      a first input node;
      a second input node;
      a first resistor coupled to the first input node;
      a second resistor coupled to the second input node;
      a self-biasing circuit coupled to the first input node and the second input node;
      a first supply voltage coupled to the first resistor and the second resistor;
      a first amplifier for generating a first internal format signal;
   a second receiver circuit comprising:
      a third input node;
      a fourth input node;
      a third resistor coupled to the third input node;
      a fourth resistor coupled to the fourth input node;

a second supply voltage coupled to the third resistor and the fourth resistor;
a second amplifier for generating a second internal format signal;
a multiplexer coupled to the first receiver circuit and the second receiver circuit for receiving the first internal format signal or the second internal format signal; and
a driver circuit coupled to the multiplexer for receiving the first internal format signal or the second internal format signal, comprising:
a first transistor and a second transistor in a differential pair configuration;
a first source termination resistor coupled to a first transistor drain at a first output node;
a second source termination resistor coupled to a second transistor drain at a second output node; and
a current source coupled to a first transistor source and a second transistor source.

41. The circuit of claim 40, further comprising a format conversion control circuit for controlling the multiplexer to route either the first internal format signal or the second internal format signal to the driver circuit.

42. A circuit comprising:
a first receiver circuit comprising:
a first input node;
a second input node;
a first resistor coupled to the first input node;
a second resistor coupled to the second input node;
a self-biasing circuit coupled to the first input node and the second input node;
a first supply voltage coupled to the first resistor and the second resistor;
a first amplifier for generating a first internal format signal;
a second receiver circuit comprising:
a third input node;
a fourth input node;
a third resistor coupled to the third input node;
a fourth resistor coupled to the fourth input node;
a second supply voltage coupled to the third resistor and the fourth resistor;
a second amplifier for generating a second internal format signal;
a multiplexer coupled to the first receiver circuit and the second receiver circuit for receiving the first internal format signal or the second internal format signal; and
a driver circuit coupled to the multiplexer for receiving the first internal format signal or the second internal format signal, comprising:
a first transistor and a second transistor in a differential pair configuration; and
a current source coupled to a first transistor source and a second transistor source.

43. The circuit of claim 42, further comprising a format conversion control circuit for controlling the multiplexer to route either the first internal format signal or the second internal format signal to the driver circuit.

* * * * *